United States Patent
Ward, Jr. et al.

(10) Patent No.: US 9,151,587 B2
(45) Date of Patent: Oct. 6, 2015

(54) BUCKET TIP SHROUD MEASUREMENT FIXTURE AND METHOD OF MEASURING BUCKET TIP SHROUD ORIENTATION

(71) Applicant: General Electric Company, Schenectady, NY (US)

(72) Inventors: John David Ward, Jr., Woodruff, SC (US); Juan Pablo Cilia, Delmar, NY (US); James Ryan Connor, Greenville, SC (US); Jason Adam Neville, Greenville, SC (US); Christopher Allen Nafis, Rexford, NY (US); Neil Robert Peddar, Benfleet (GB); Antonio Rodriguez, Simpsonville, SC (US); Daniel Howard Tragesser, Marietta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 150 days.

(21) Appl. No.: 14/076,558

(22) Filed: Nov. 11, 2013

(65) Prior Publication Data
US 2015/0128433 A1    May 14, 2015

(51) Int. Cl.
*G01B 5/008* (2006.01)
*G01B 5/20* (2006.01)
*G01B 5/00* (2006.01)
*F01D 11/00* (2006.01)

(52) U.S. Cl.
CPC ............... *G01B 5/008* (2013.01); *F01D 11/00* (2013.01); *G01B 5/0002* (2013.01); *G01B 5/0004* (2013.01); *G01B 5/205* (2013.01)

(58) Field of Classification Search
CPC .............................. G01B 5/205; G01B 5/0002
USPC ............................................. 33/503, 549, 645
See application file for complete search history.

(56) References Cited

U.S. PATENT DOCUMENTS

| 2,977,533 | A |   | 3/1961  | Savage |
|-----------|---|---|---------|--------|
| 4,333,239 | A |   | 6/1982  | Arrigoni |
| 4,364,182 | A | * | 12/1982 | Jones .............................. 33/567 |
| 4,884,889 | A | * | 12/1989 | Beckwith, Jr. ................ 356/620 |
| 4,916,942 | A |   | 4/1990  | Davidson |

(Continued)

FOREIGN PATENT DOCUMENTS

| CN | 101943557 A | 1/2011 |
|----|-------------|--------|
| CN | 102519333 A | 6/2012 |

(Continued)

OTHER PUBLICATIONS

EP Search Report issued on Mar. 23, 2015 in connection with EP Application 14191892.0.

*Primary Examiner* — Christopher Fulton

(57) ABSTRACT

A bucket tip shroud measurement fixture includes a frame extending from a first end to a second end through an intermediate portion having a first surface and an opposing second surface, a first tip shroud fixing member extending from the second surface of the frame at the first end, and a second tip shroud fixing member extending from the second surface of the frame at the second end. The first and second tip shroud fixing members are configured and disposed to retain and establish an orientation of a bucket tip shroud relative the frame. A plurality of reference points are provided on the frame. The plurality of reference points are configured and disposed to receive a coordinate measuring machine (CMM) probe.

23 Claims, 8 Drawing Sheets

(56) References Cited

U.S. PATENT DOCUMENTS

| | | | |
|---|---|---|---|
| 4,976,026 A * | 12/1990 | Dacey, Jr. | 29/714 |
| 5,133,643 A | 7/1992 | Ortolano | |
| 5,162,659 A | 11/1992 | Diamond et al. | |
| 5,182,866 A * | 2/1993 | Heymann | 33/645 |
| 6,143,003 A * | 11/2000 | Cosman | 606/130 |
| 6,164,916 A | 12/2000 | Frost et al. | |
| 6,427,356 B1 * | 8/2002 | Schamal | 33/613 |
| 6,701,616 B2 | 3/2004 | Smith et al. | |
| 6,792,655 B2 | 9/2004 | Wah | |
| 6,817,108 B2 * | 11/2004 | Eaton | 33/503 |
| 6,842,995 B2 | 1/2005 | Jones et al. | |
| 6,906,808 B2 | 6/2005 | Trantow et al. | |
| 6,910,278 B2 | 6/2005 | Holder | |
| 6,983,659 B2 | 1/2006 | Soechting et al. | |
| 7,024,787 B2 | 4/2006 | Varsell et al. | |
| 7,024,788 B2 * | 4/2006 | Mason | 33/608 |
| 7,328,496 B2 | 2/2008 | Powers et al. | |
| 7,329,076 B2 * | 2/2008 | Hartney et al. | 411/60.1 |
| 7,337,520 B2 | 3/2008 | Jones et al. | |
| 7,412,780 B2 | 8/2008 | Holder | |
| 7,497,029 B2 * | 3/2009 | Plassky et al. | 33/645 |
| 7,762,004 B2 | 7/2010 | Sherlock et al. | |
| 7,814,676 B2 * | 10/2010 | Sampica et al. | 33/645 |
| 8,043,061 B2 | 10/2011 | Chiurato et al. | |
| 8,571,637 B2 * | 10/2013 | Sheffer et al. | 600/424 |
| 2009/0064520 A1 | 3/2009 | Sherlock et al. | |

FOREIGN PATENT DOCUMENTS

| | | |
|---|---|---|
| JP | 2006097649 A | 4/2006 |
| WO | 2008094972 A2 | 8/2008 |

* cited by examiner

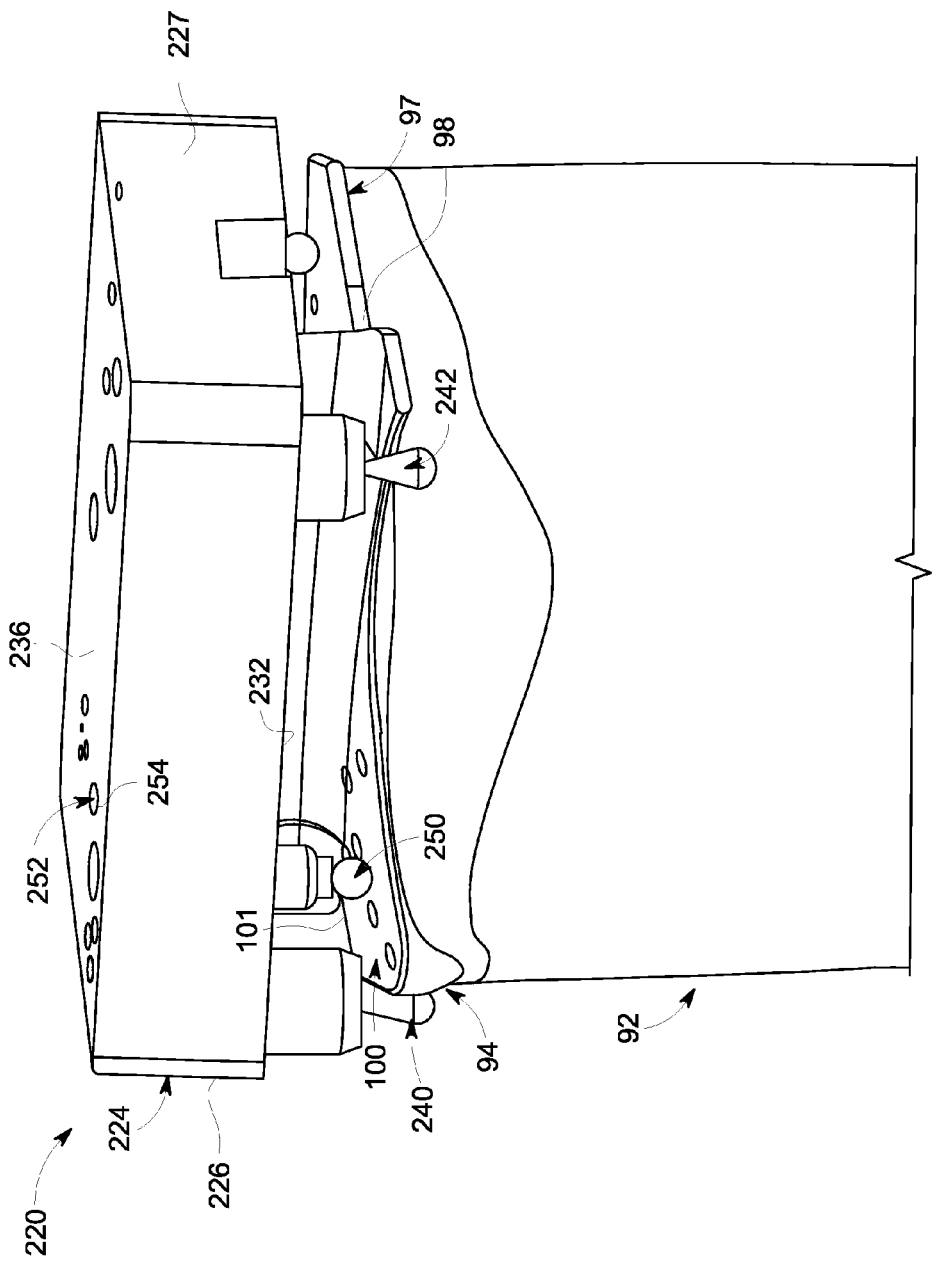

BUCKET TIP SHROUD MEASUREMENT FIXTURE AND METHOD OF MEASURING BUCKET TIP SHROUD ORIENTATION

BACKGROUND OF THE INVENTION

The subject matter disclosed herein relates to the art of turbomachines and, more particularly, to a measurement fixture for a turbomachine bucket tip shroud.

Turbomachines include a compressor portion linked to a turbine portion through a common compressor/turbine shaft and a combustor assembly. An inlet airflow is passed through an air intake toward the compressor portion. In the compressor portion, the inlet airflow is compressed through a number of sequential stages toward the combustor assembly. In the combustor assembly, the compressed airflow mixes with a fuel to form a combustible mixture. The combustible mixture is combusted in the combustor assembly to form hot gases. The hot gases are guided along a hot gas path of the turbine portion through a transition piece. The hot gases expand along a hot gas path through a number of turbine stages acting upon turbine bucket airfoils mounted on wheels to create work that is output, for example, to power a generator.

Bucket airfoils may include a tip shroud having a Z-shaped geometry. The Z-shaped geometry establishes a sealing ring having small gaps between adjacent bucket airfoil tip shrouds. During operation, bucket airfoils may twist. A twist in one or more bucket airfoils may enlarge the gaps allowing hot gases to exit prematurely from the hot gas path. Changes in the gaps may also cause bucket airfoils to interact with one another in a manner that could result in damage. Bucket airfoils are periodically removed and measured to determine if, and how much, twisting may have occurred.

BRIEF DESCRIPTION OF THE INVENTION

According to one aspect of the invention, a bucket tip shroud measurement fixture includes a frame extending from a first end to a second end through an intermediate portion having a first surface and an opposing second surface, a first tip shroud fixing member extending from the second surface of the frame at the first end, and a second tip shroud fixing member extending from the second surface of the frame at the second end. The first and second tip shroud fixing members are configured and disposed to retain and establish an orientation of a bucket tip shroud relative the frame. A plurality of reference points are provided on the frame. The plurality of reference points are configured and disposed to receive a coordinate measuring machine (CMM) probe. According to another aspect of the invention, a method of measuring a bucket tip shroud of a turbomachine bucket includes securing a rotor end of the turbomachine bucket in a holding fixture, positioning a bucket tip shroud measurement fixture including a frame supporting first and second tip shroud fixing members at a shroud on an opposing end of the turbomachine bucket, engaging the first and second tip fixing shroud members to the shroud, determining a position of one or more reference points provided on the frame with a measurement probe, and calculating, through a computer measurement system, a position of the shroud relative to the rotor end of the turbomachine bucket.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8 is a perspective view of a bucket tip shroud measurement fixture, in accordance with another exemplary embodiment.

Figure 1:
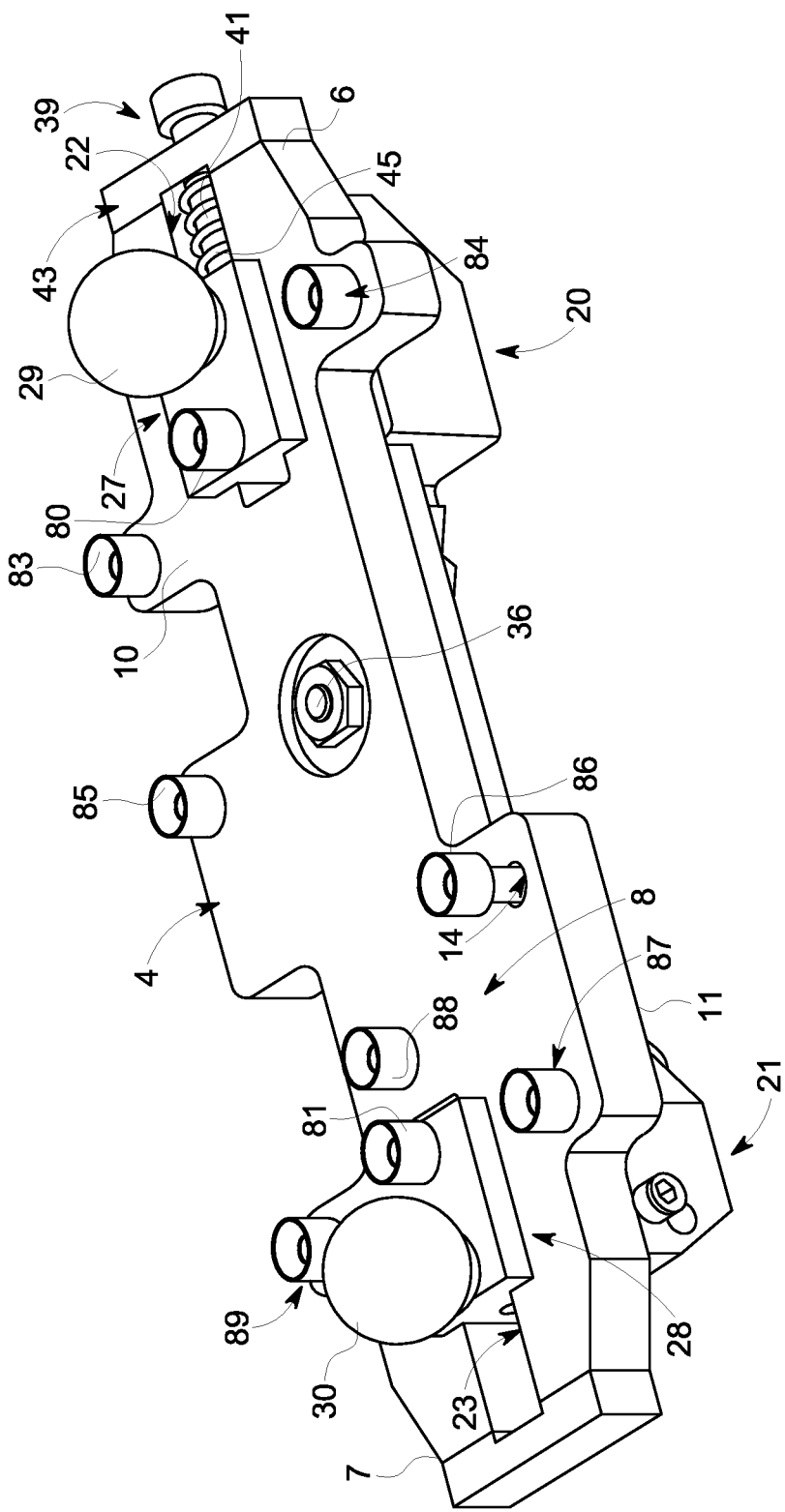
FIG. 1 is an upper perspective view of a bucket tip shroud measurement fixture, in accordance with an exemplary embodiment.

The detailed description explains embodiments of the invention, together with advantages and features, by way of example with reference to the drawings.

DETAILED DESCRIPTION OF THE INVENTION

A bucket tip measurement fixture, in accordance with an exemplary embodiment, is indicated at 2, in FIGS. 1-4. Bucket tip measurement fixture 2 includes a frame 4 that extends from a first end 6 to a second end 7 through an intermediate portion 8 having a first surface 10 and an opposing second surface 11. A plurality of reference openings, one of which is indicated at 14, extends through frame 4 between first and second surfaces 10 and 11. Bucket tip measurement fixture 2 includes a first tip shroud fixing member 20 arranged at first end 6 and a second tip shroud fixing member 21 arranged at second end 7. First and second tip shroud fixing members 20 and 21 are slidingly received in corresponding first and second slots 22 and 23 formed in frame 4.

Figure 2:
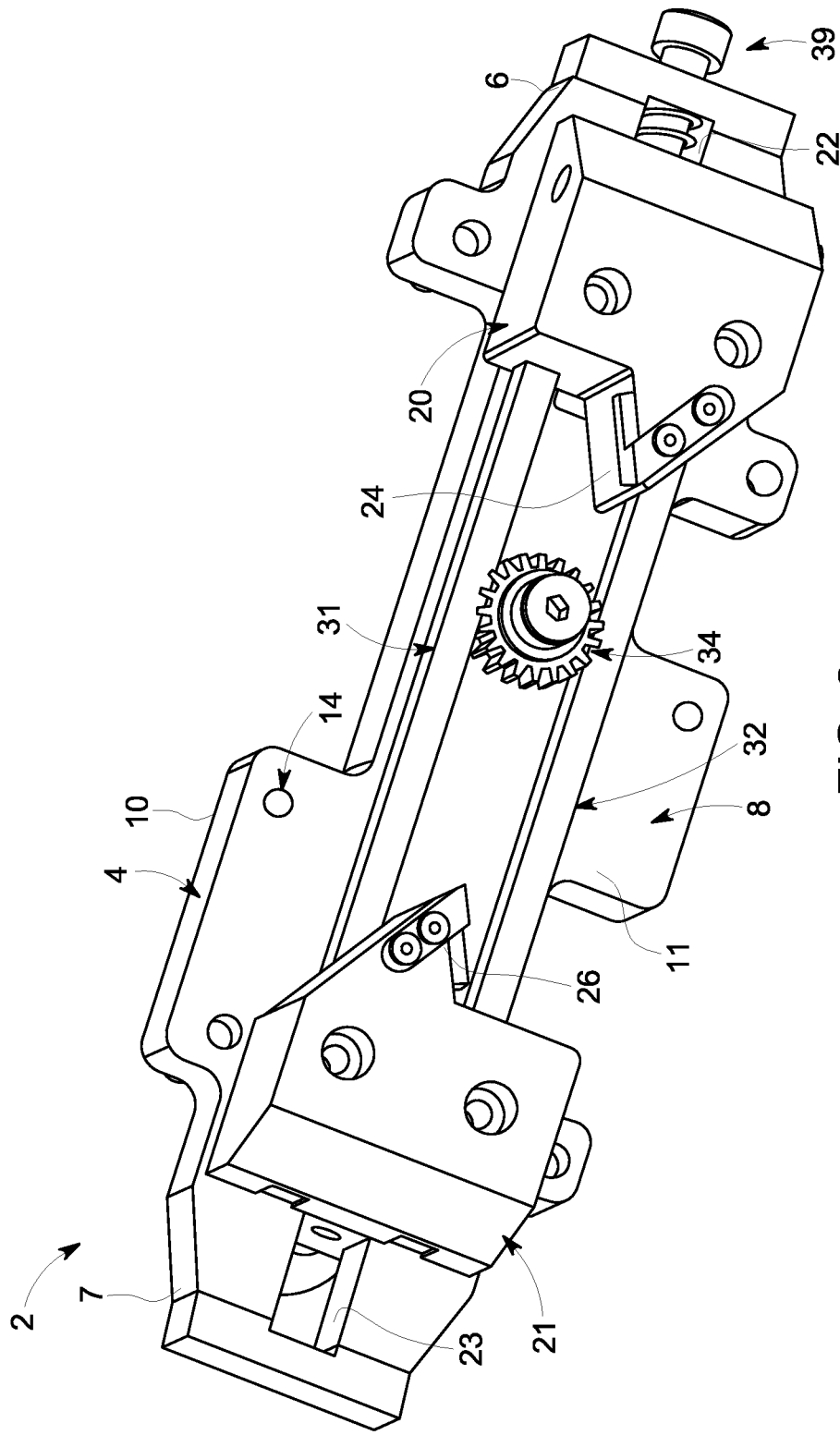
FIG. 2 is a lower perspective view of the bucket tip shroud of FIG. 1
Figure 3:
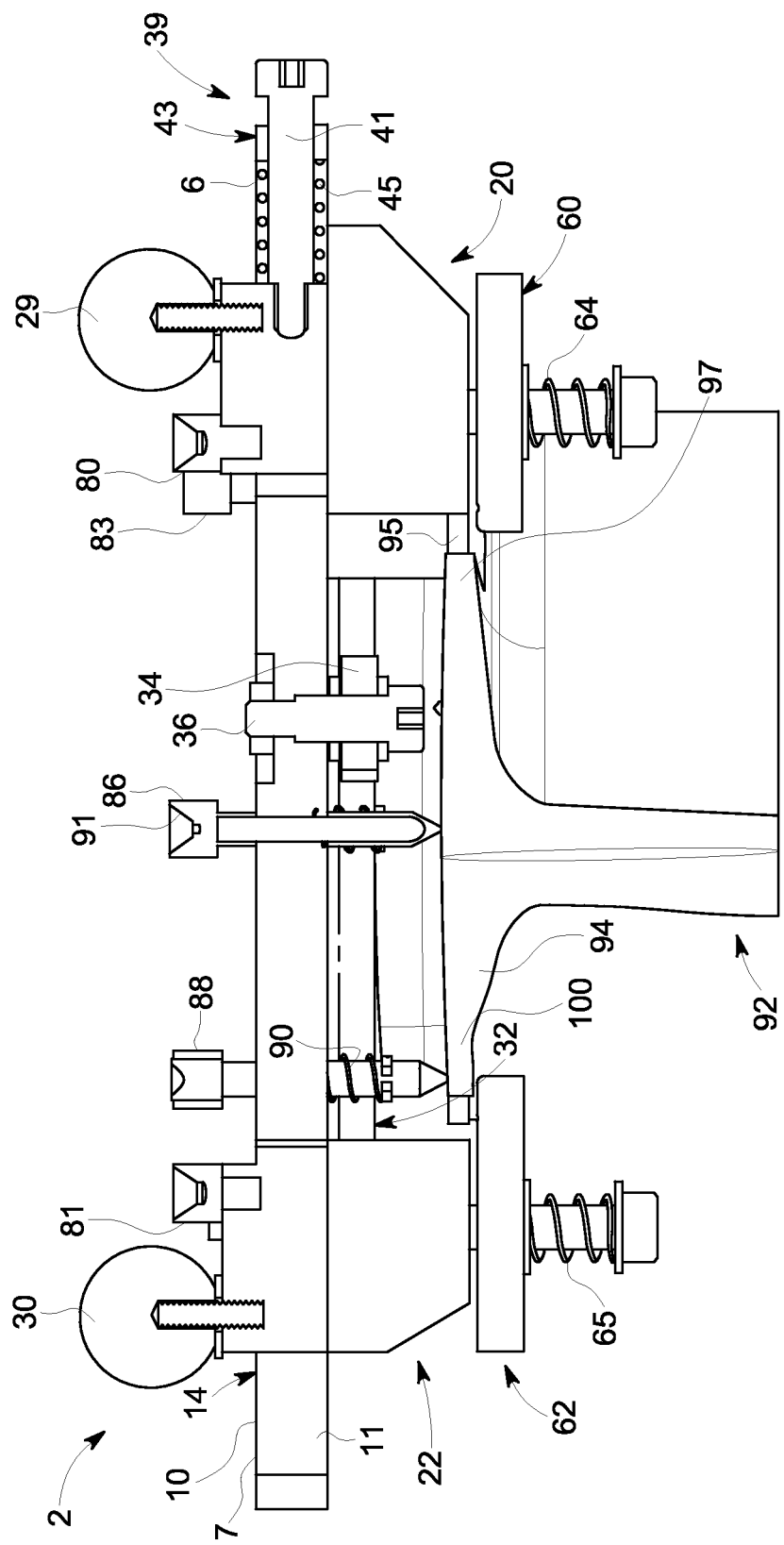
FIG. 3 is a cross-sectional side view of the bucket tip shroud measurement fixture of FIG. 1.

As best seen in FIG. 2, first tip shroud fixing member 20 is mounted at second surface 11 and includes a first Z-notch locating element 24. Similarly, second tip shroud fixing member 21 is mounted at second surface 11 and includes a second Z-notch locating element 26. A first reference section 27 is arranged at first surface 10 and operatively connects with first tip shroud fixing member 20. A second reference section 28 is arranged at first surface 10 and operatively connects with second tip shroud fixing member 21. First and second reference sections 27 and 28 include corresponding first and second actuators 29 and 30 having a generally spherical shape. First tip shroud fixing member 20 is mechanically linked to second tip shroud fixing member 21 through a first connector 31 and a second connector 32. First and second connectors 31 and 32 are also operatively connected through a gear 34 supported by an axle 36.

With this arrangement, outward movement (movement away from axle 36) of first tip shroud fixing member 20 through first actuator 29 causes a similar outward movement of second tip shroud fixing member 21. Similarly, inward movement (movement toward axle 36) of first tip shroud fixing member 20 causes a corresponding inward movement of second tip shroud fixing member 21. Of course, it should be understood, that movement imparted to second tip shroud fixing member 21 through, for example, second actuator 30 is imparted to first tip shroud fixing member 20. A biasing element 39 is arranged at first end 6 of frame 4. As will be detailed below, biasing element 39 urges first and second tip shroud fixing members 20 and 21 inwardly on frame 4. Biasing element 39 includes a post 41 that extends through an end cap 43 attached to first end 6 across slot 22 and connects with first tip shroud fixing member 20. A coil spring 45 encircles post 41 and acts between end cap 43 and first tip shroud fixing member 20. In this manner, coil spring 45 urges first and second tip shroud fixing members 20 and 21 inwardly to grip a bucket tip shroud as will be detailed more fully below.

Bucket tip measurement fixture 2 also includes a first clamp member 60 mechanically linked to first tip shroud fixing member 20 and a second clamp member 62 mechanically linked to second tip shroud fixing member 21. Clamp member 60 includes a first biasing element 64. Second clamp member 62 includes a second biasing element 65. Clamp members 60 and 62 provide additional stability to fixture 2 when mounted. In further accordance with the exemplary embodiment shown, fixture 2 includes a plurality of reference elements 80-81 and 83-89. Reference elements 80 and 81 are mounted to first and second reference sections 27 and 28 while the remaining reference elements 83-89 are positioned in corresponding ones of the plurality of reference openings 14. Each reference element 80-81 and 83-89 includes a corresponding biasing element such as shown at 90 and a probe receiving pocket such as shown at 91. Reference elements 80-81 and 83-89 provide spatial locators that may be probed by coordinate measuring machine (CMM) (not shown) as will be discussed more fully below.

Figure 4:
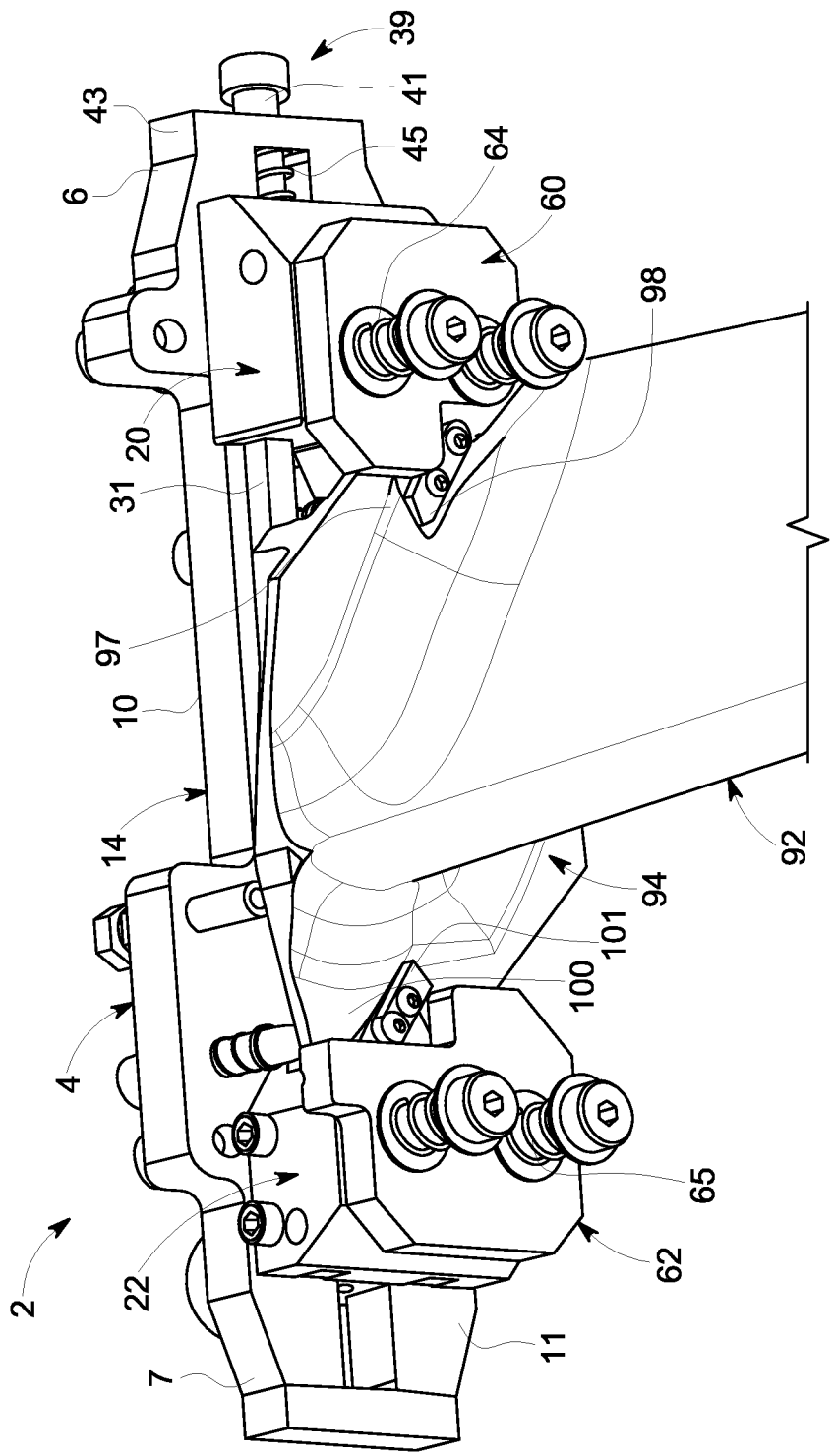
FIG. 4 is a perspective view of the bucket tip shroud measurement fixture of FIG. 1 mounted to a turbomachine bucket tip shroud, in accordance with an aspect of the exemplary embodiment.
Figure 5:
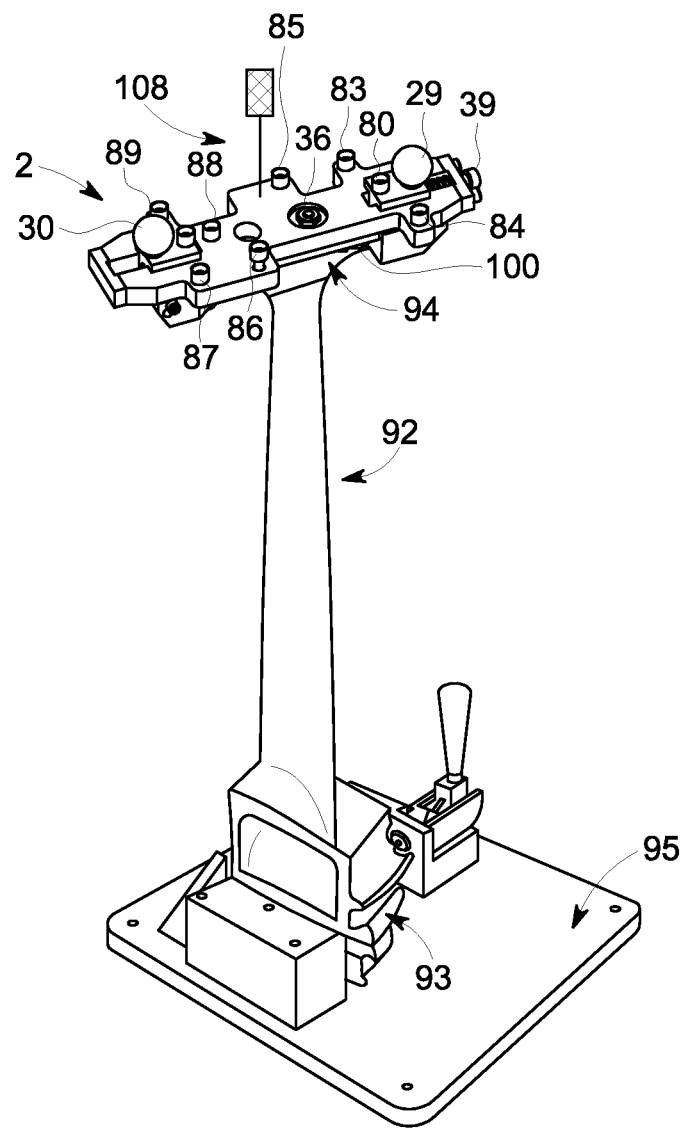
FIG. 5 is a perspective view of the bucket tip shroud measurement fixture mounted to a bucket tip shroud ready for measuring

FIG. 5 illustrates a turbomachine bucket 92 that extends from a first end 93 to a tip shroud 94. Bucket 92 is shown mounted in a measuring support 95 at first end 93. Measuring support 95 positions bucket 92 for interaction with a CMM. Tip shroud 94 includes a first end 97 having a first Z-notch 98 (FIG. 4) and a second end 100 having a second Z-notch 101 (FIG. 4). Bucket tip measurement fixture 2 is mounted to tip shroud 94 with first Z-notch locating element 24 nesting within first Z-notch 98 and second Z-notch locating element 26 nesting within second Z-notch 101. At this point, first and second clamp members 60 and 62 are positioned to grip corresponding ones of first and second ends 97 and 100 of tip shroud 94. Reference elements 80-81 and 83-89 contact select portions of tip shroud 94 with contact being maintained through each biasing element 90. Once in position, a CMM probe 108 is introduced into each probe receiving pocket 91 to determine a spatial position of each reference element 80-81 and 83-89. Once all reference elements 80-81 and 83-89 are probed, spatial data is computer analyzed to determine whether tip shroud 94 has moved relative to first end 93 of bucket 92. If it is determined that tip shroud 94 has moved, and the amount of movement is outside acceptable parameters, bucket 92 may be replaced. At this point it should be understood that reference elements 80-81 and 83-89 may simply take the form of depressions formed in first surface 10 or openings that extend through frame 4. Depressions may be contacted by a CMM probe while openings may allow a CMM probed to pass through frame 4 and contact bucket tip shroud 94.

Figure 6:
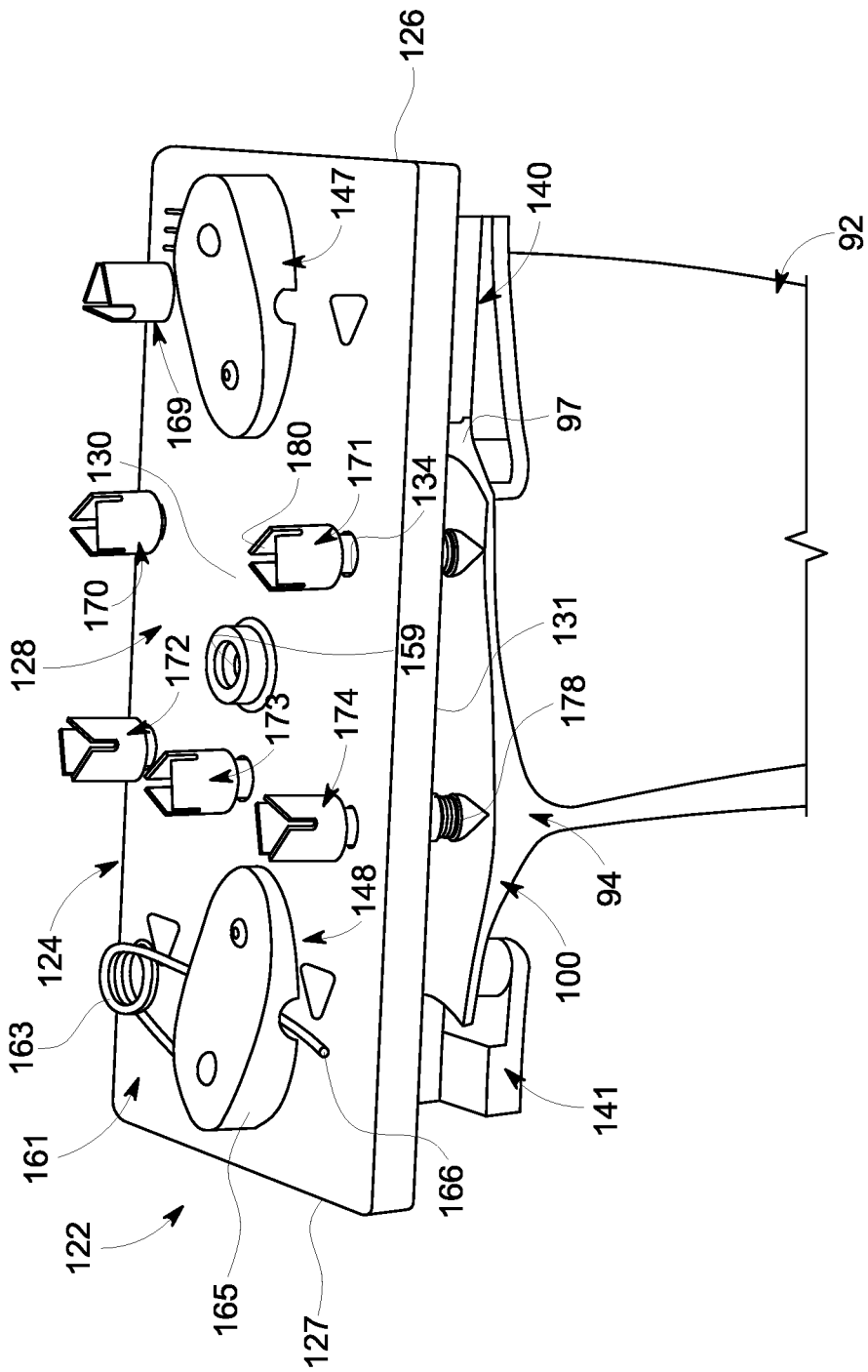
FIG. 6 is an upper perspective view of a bucket tip shroud measurement fixture, in accordance with another aspect of the exemplary embodiment, mounted to a turbomachine bucket tip shroud.
Figure 7:
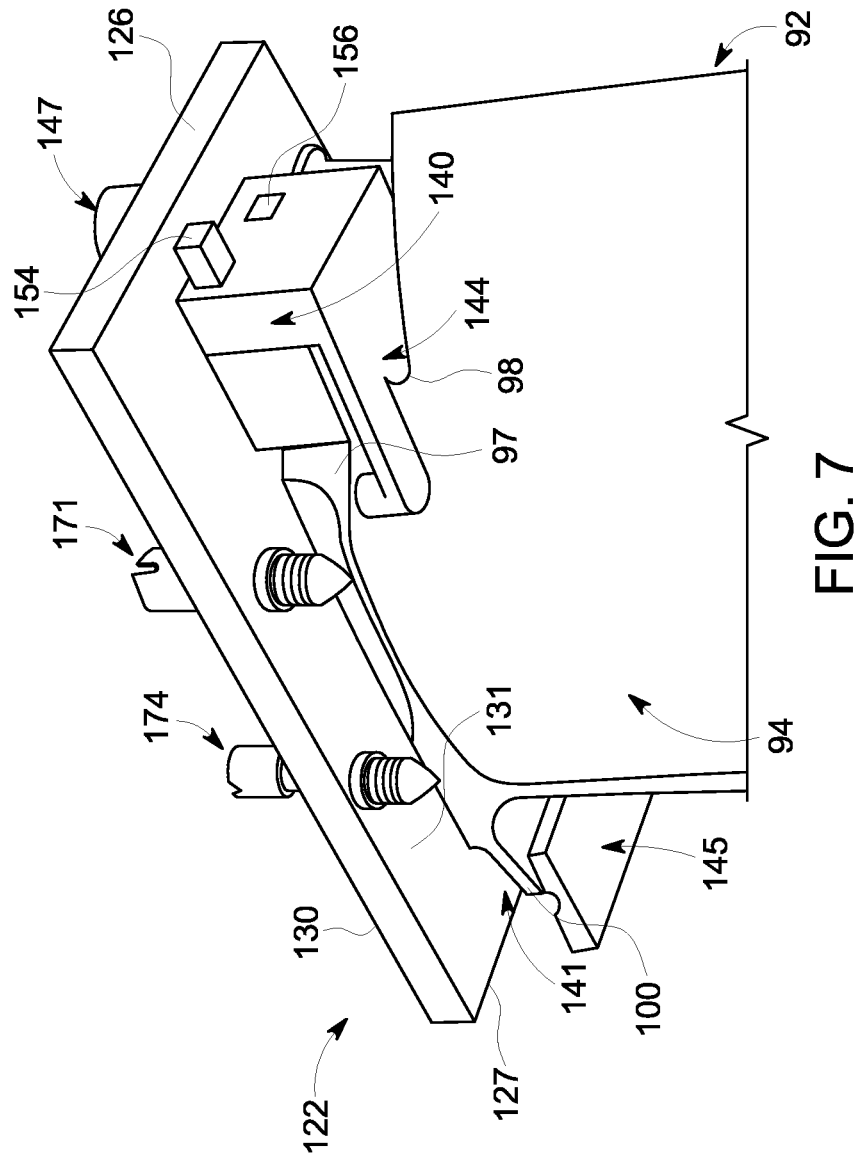
FIG. 7 is a lower perspective view of the bucket tip shroud measurement fixture of FIG. 5.

Reference will now follow to FIGS. 6 and 7 in describing a bucket tip measurement fixture 122, in accordance with another aspect of the exemplary embodiment. Bucket tip measurement fixture 122 includes a frame 124 extending from a first end 126 to a second end 127 through an intermediate portion 128. Frame 124 includes a first surface 130 and an opposing second surface 131. Frame 124 also includes a plurality of reference openings 134 that extends between first and second surfaces 130 and 131. A first tip shroud fixing member 140 is arranged at first end 126 and a second tip shroud fixing member 141 is arranged at second end 127. First and second tip shroud fixing members 140 and 141 include corresponding first and second Z-notch locating elements 144 and 145. In addition, first and second support elements 147 and 148 support respective ones of first and second tip shroud fixing members 140 and 141 relative to frame 124.

A first connector 154 mechanically links first tip shroud fixing member 140 with second tip shroud fixing member 141. A second connector 156 also mechanically links first tip shroud fixing member 140 with second tip shroud fixing member 141. First and second connectors 154 and 156 are linked through a gear (not shown) supported by an axle 159. With this arrangement, movement of one of first and second tip shroud fixing members 140 and 141 between first and second end 126 and 127 is imparted to the other of first and second tip shroud fixing members 140 and 141. A biasing element 161, shown in the form of a spring clip 163, is operatively connected to second tip shroud fixing member 141. Spring clip 163 extends from first end section 165 fixed to frame 124 at first surface 130 to a second end section 166 that is linked to second tip shroud fixing member 141. In this manner, biasing element 161 urges first and second tip shroud fixing members 140 and 141 inwardly toward axle 159.

Bucket tip measurement fixture 122 also includes a plurality of reference elements 169-174 each having a corresponding biasing member 178 and probe receiving pocket 180. In a manner similar to that described above, bucket tip measurement fixture 122 is mounted to a bucket that is supported in a fixture. Each reference element 169-174 is probed by a CMM probe to determine whether the bucket tip shroud has moved or twisted during operation in a turbomachine. If movement/twisting is detected, and the degree of movement is outside acceptable parameters, the bucket may be replaced. At this point, it should be understood that reference elements 169-174 may simply take the form of depressions formed in first surface 130 or openings that extend through frame 124. Depressions may be contacted by a CMM probe while openings may allow a CMM probe to pass through frame 4 and contact bucket tip shroud 94.

Reference will now follow to FIG. 8, wherein like reference numbers represent corresponding parts in the respective views, in describing a bucket tip measurement fixture 220 in accordance with yet another aspect of the exemplary embodiment. Bucket tip measurement fixture 220 includes a frame 224 having a first end 226 that extends to a second end 227. Frame 224 also includes a first surface 230 and a second, opposing surface 232. A first tip shroud fixing member 240 extends from second surface 232 at first end 226 and a second tip shroud fixing member 242 extends from second surface 232 at second end 227. First and second tip shroud fixing members 240 and 242 are biased toward a center (not separately labeled) of frame 224 so as to retain bucket tip shroud 94.

Bucket tip shroud measurement fixture 220 also includes a plurality of reference elements 250 that project from second surface 232 and contact bucket tip shroud 94. Reference elements 250 establish a particular reference frame 224 for bucket tip shroud measurement fixture 220, bucket tip shroud 94 and first end 93. Frame 224 also includes a plurality of reference points 252 formed in first surface 230. Reference points 252 may be openings that extend through frame 224 or may simply be depressions formed in first surface 230. Reference points 252 are configured to be probed by a CMM probe to determine whether the bucket tip shroud 94 has moved or twisted during operation in a turbomachine. Depressions may be contacted by a CMM probe while openings may allow a CMM probed to pass through frame 224 and contact bucket tip shroud 94. The particular form of reference points 252 may vary.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bucket tip shroud measurement fixture comprising:
   a frame extending from a first end to a second end through an intermediate portion having a first surface and an opposing second surface;
   a first tip shroud fixing member extending from the second surface of the frame at the first end;
   a second tip shroud fixing member extending from the second surface of the frame at the second end, the first and second tip shroud fixing members being configured and disposed to retain and establish an orientation of a bucket tip shroud relative the frame; and
   a plurality of reference points provided on the frame, the plurality of reference points being configured and disposed to receive a coordinate measuring machine (CMM) probe.

2. The bucket tip shroud measurement fixture according to claim 1, wherein the first tip shroud fixing member and the second tip shroud fixing member is moveably mounted relative to the frame.

3. The bucket tip shroud measurement fixture according to claim 2, further comprising: a biasing element operatively connected to at least one of the first and second tip shroud fixing members, the biasing element urging the at least one of the first and second tip shroud fixing members toward the other of the first and second tip shroud fixing members.

4. The bucket tip shroud measurement fixture according to claim 3, wherein the biasing element comprises a coil spring.

5. The bucket tip shroud measurement fixture according to claim 3, wherein the biasing element comprises a spring clip.

6. The bucket tip shroud measurement fixture according to claim 2, wherein the first tip shroud fixing member is mechanically linked to the second tip shroud fixing member.

7. The bucket tip shroud measurement fixture according to claim 2, wherein each of the first tip shroud fixing member and the second tip shroud fixing member is selectively shiftable between the first and second ends of the frame.

8. The bucket tip shroud measurement fixture according to claim 1, wherein each of the plurality of reference points comprises a reference depression formed in the first surface of the frame.

9. The bucket tip shroud measurement fixture according to claim 8, further comprising: a plurality of reference elements arranged in a respective reference opening, each of the plurality of reference elements extending through the frame and contacting a portion of the bucket tip shroud.

10. The bucket tip shroud measurement fixture according to claim 9, wherein each of the plurality of reference elements includes a biasing element.

11. The bucket tip shroud measurement fixture according to claim 9, wherein each of the plurality of reference elements includes a probe receiving pocket.

12. The bucket tip shroud measurement fixture according to claim 1, wherein each of the first and second tip shroud fixing members includes a Z-notch locating element.

13. The bucket tip shroud measurement fixture according to claim 1, wherein each of the first and second tip shroud fixing members includes a clamp member having a biasing element that urges the clamp member toward the second surface of the frame.

14. The bucket tip shroud measurement fixture according to claim 1, wherein each of the plurality of reference points comprises a reference opening that extends through the frame.

15. A method of measuring a bucket tip shroud of a turbomachine bucket, the method comprising:
    securing a rotor end of the turbomachine bucket in a holding fixture;
    positioning a bucket tip shroud measurement fixture including a frame supporting first and second tip shroud fixing members at a shroud on an opposing end of the turbomachine bucket;
    engaging the first and second tip shroud fixing members to the shroud;
    determining a position of one or more of a plurality of reference points provided on the frame with a measurement probe; and
    calculating through a computer measurement system a position of the shroud relative to the rotor end of the turbomachine bucket.

16. The method of claim 15, further comprising: positioning a reference element through one or more of the plurality of reference points.

17. The method of claim 16, wherein determining the position of the one or more plurality of reference points includes contacting the reference element with the measurement probe.

18. The method of claim 15, wherein engaging the first and second tip shroud fixing members to the bucket tip shroud includes biasing one of the first and second tip shroud fixing members toward the other of the first and second tip shroud fixing members.

19. The method of claim 15, wherein engaging the first and second tip shroud fixing members to the bucket tip shroud includes biasing each of the first and second tip shroud fixing members toward the bucket tip shroud, the first tip shroud fixing member being mechanically linked to the second tip shroud fixing member.

20. The method of claim 15, wherein engaging the first and second tip shroud fixing members to the bucket tip shroud includes positioning a first Z-notch locating element on the first tip shroud fixing member in a first Z-notch of the shroud and a second Z-notch locating element on the second tip shroud fixing member in a second Z-notch of the shroud.

21. The method of claim 15, wherein engaging the first and second tip shroud fixing members to the bucket tip shroud includes clamping shroud between the first and second tip shroud fixing members and the frame.

22. The method of claim 15, wherein determining the position of the one or more plurality of reference points includes contacting a reference depression with a coordinate measuring machine (CMM) probe.

23. The method of claim 15, wherein determining the position of the plurality of reference points includes passing a coordinate measuring machine (CMM) probe through an opening formed in the frame, the measurement probe contacting the bucket tip shroud.

\* \* \* \* \*